(No Model.)
S. ELLIOTT.
WHEEL.
No. 444,485.  Patented Jan. 13, 1891.
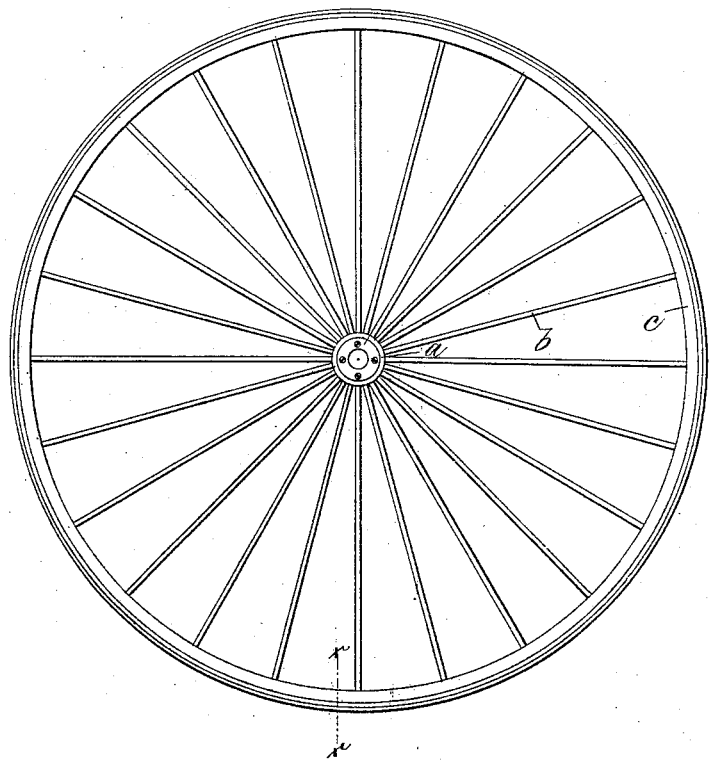
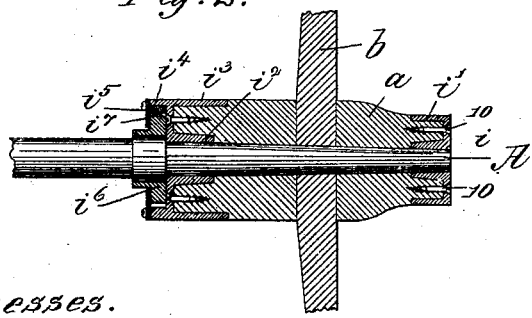
Witnesses.
Arthur Zipperlen
John F. C. Prankerd
Inventor.
Sterling Elliott.
by Crosby & Gregory
attys

UNITED STATES PATENT OFFICE.

STERLING ELLIOTT, OF NEWTON, MASSACHUSETTS.

WHEEL.

SPECIFICATION forming part of Letters Patent No. 444,485, dated January 13, 1891.

Application filed August 12, 1886. Serial No. 210,685. (No model.)

*To all whom it may concern:*

Be it known that I, STERLING ELLIOTT, of Newton, county of Middlesex, and State of Massachusetts, have invented an Improvement in Wheels, of which the following description, in connection with the accompanying drawings, is a specification, like letters on the drawings representing like parts.

This invention has for its object to improve the construction of wheels especially adapted for velocipedes, whereby the wheel may be adapted to turn freely on the axle in a forward direction at a speed faster than the driving-axle.

In accordance with this invention the outer end of the hub of the wheel has secured to it a box and band or rim cast in one piece, the box serving as a bearing for the axle, while the band acts to prevent the hub from splitting. The inner end of the hub has a similar box and band provided with a flange to leave a recess within which may enter a ratchet-toothed wheel secured upon the shaft of the velocipede, the teeth of the said wheel engaging suitable pawls pivoted within the said flange when the axle is driven in one direction, the ratchet-wheel in its opposite movement clicking past the pawls. In lieu of a ratchet-and-pawl clutch mechanism, any other suitable clutch mechanism may be employed. This enables the wheel to be moved freely on the axle in a forward direction at a speed faster than the ratchet-wheel.

Figure 1 shows in side elevation a wheel embodying this invention, and Fig. 2 a longitudinal section of the hub and its adjacent parts.

The wheel, composed of a hub $a$, spokes $b$, and felly $c$, preferably of wood, may be of any desired size. The outer end of the hub $a$ of the wheel is provided with a box $i$ and an outside band or rim $i'$, made preferably in one piece, the box $i$ serving as a bearing for the axle A and the band or rim preventing the hub from splitting. The inner end of the hub $a$ is provided with a similar box $i^2$ and band $i^3$ cast in one piece, and having a flange $i^4$, suitably projecting to form a recess within which is pivoted one or more pawls $i^5$, which engage the teeth of a ratchet-wheel $i^6$, secured to the axle A, a suitable guard or plate $i^7$ being attached to the flange $i^4$ to protect the ratchet and pawls from dust and to retain the wheel on the axle A. The combined box and band is forced upon the end of the hub and secured in usual manner, as by screws 10.

By making the box and band in one piece, or by making the box in a separate piece having a flush metallic connection with the band, the hub may be held firmly to center the wheel, and also may be retained in its own true form or shape. The ratchet-toothed wheel and pawls co-operating with it constitute a clutch mechanism by which to rotate the wheels; but instead of the particular form of clutch mechanism shown I may employ any other usual or well-known form of clutch, either a toothed clutch or it may be a friction-clutch.

I claim—

1. In a wheel, a hub having a box rigidly secured to its end, and means, substantially as shown, for holding the box concentric with the outer band, in combination with a clutch mechanism intermediate said box and band for revolving the wheel, substantially as shown and described.

2. In a wheel, a hub having a box and an outer band provided with a rearwardly-extended flange $i^4$, substantially as described, combined with a clutch mechanism located within the recess formed by the flange $i^4$, substantially as described.

3. In a wheel, a hub having a box and an outer band provided with a rearwardly-extended flange, substantially as described, and a dust plate or guard attached to said flange, combined with a clutch mechanism within the recess formed by the flange and covered by said dust-plate, substantially as described.

In testimony whereof I have signed my name to this specification in the presence of two subscribing witnesses.

STERLING ELLIOTT.

Witnesses:
BERNICE J. NOYES,
C. M. CONE.